ROTARY STORAGE FILE

Filed May 15, 1958

4 Sheets-Sheet 1

INVENTOR:
Rouel R. Campbell
By Smyth & Roston
Attorneys

June 28, 1960 R. R. CAMPBELL 2,942,373

ROTARY STORAGE FILE

Filed May 15, 1958 4 Sheets-Sheet 2

INVENTOR:
Roual R. Campbell

By Smyth & Roston
Attorneys

June 28, 1960 R. R. CAMPBELL 2,942,373

ROTARY STORAGE FILE

Filed May 15, 1958 4 Sheets-Sheet 3

INVENTOR:
Rouel R. Campbell

By Smyth & Roston
Attorneys

INVENTOR:
Rouel R. Campbell

By Smyth & Roston
Attorneys

United States Patent Office 2,942,373
Patented June 28, 1960

2,942,373

ROTARY STORAGE FILE

Rouel R. Campbell, 4701 Coliseum, Apt. 7, Los Angeles 16, Calif.

Filed May 15, 1958, Ser. No. 735,517
15 Claims. (Cl. 45—81)

This invention relates to a drum or wheel type file for conveniently accessible storage of data units such as written, typed and printed records.

While the invention is widely applicable for its general purpose, it has special utility for the ready reference filing of multiple sheet data units. The invention has been initially embodied in a rotary storage file for catalogs of hardware and various commercially available items used in industry. This particular embodiment of the invention has been selected by way of example for the present disclosure and will provide adequate guidance for those skilled in the art who may have occasion to apply the same principles for other specific purposes.

A rotary storage file of this general type comprises a drum or wheel structure of open framework construction with a circumferential series of longitudinal support members on which the catalogs or like data units are mounted. For reference to a particular catalog, the storage wheel structure is rotated to bring the desired catalog to an inspection station. In the preferred practice of the invention, the storage file is horizontally positioned for rotation about a horizontal axis and the inspection station is on the upper side of the orbit path of the catalogs.

One of the more important problems met by the invention is to provide an automatic selection control whereby operation of a selector means results automatically in power actuation of the rotary file to bring the desired data unit to the inspection station. This end is achieved by providing a series of selector members, each of which may be manually set and by further providing switch means responsive to the selector members for driving the rotary file. The manual setting of any given selector member closes the switch means and energizes the motor, and means operatively connected with the rotary file for movement synchronously therewith is carried against the selector member to unset the selector member and thereby open the switch means when the selected data unit reaches the inspection station.

Another problem to which the invention is directed is to cause the selected multiple sheet data unit or catalog to take an attitude at the inspection station that is of maximum convenience to the user for leafing through the data unit. For this purpose, support members for the data units are rotatably mounted on the storage wheel and are provided with control projections that move orbitally to cooperate with a stationary control member. The rotary file is operated in one direction only, and as each data unit approaches the inspection station, the control projection of the support on which the data unit is mounted encounters the stationary control member to swing the data unit from a position extending counter to the direction of rotation to a position extending in the opposite circumferential direction. As subsequent rotation of the storage files carries the data unit to the lowest point in the orbit, the data unit hangs downward from the storage file and with continued rotation of the storage file, the data unit drops back again in the direction counter to the rotation of the file.

As will be explained, the preferred practice of the invention is further characterized by other important features. One of these features is an advantageous construction for the longitudinal supports by means of which the catalogs are swingably mounted in the rotary storage file. Another feature is the manner in which the motor, gearing and switch means and other important working parts are housed inside the rotary wheel structure itself.

The various features and advantages of the invention will be apparent from the following detailed description taken with the accompanying drawings.

In the drawings, which are to be regarded as merely illustrative:

Figure 3:
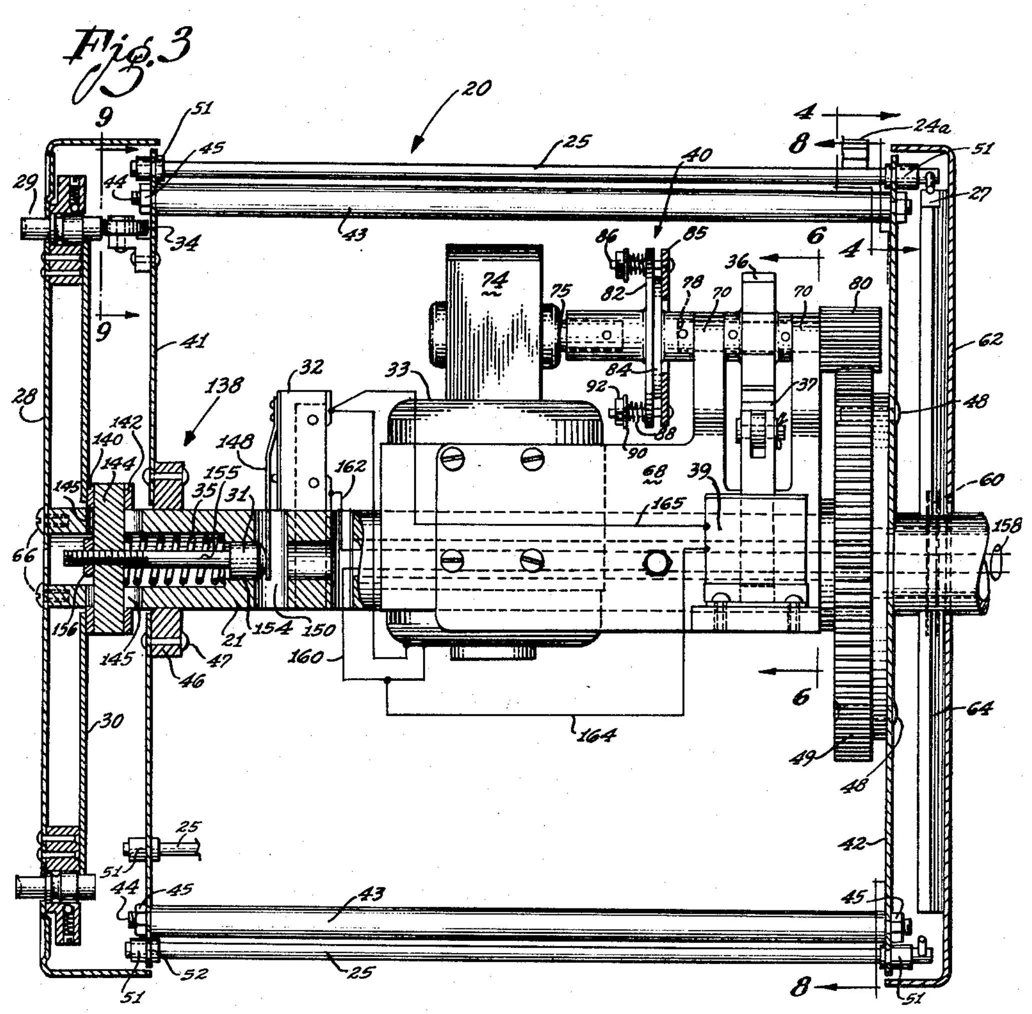
Fig. 3 is a simplified vertical sectional view of the wheel structure of the rotary file together with the motor, gearing and switch means that are positioned inside the wheel structure.
Figure 7A:
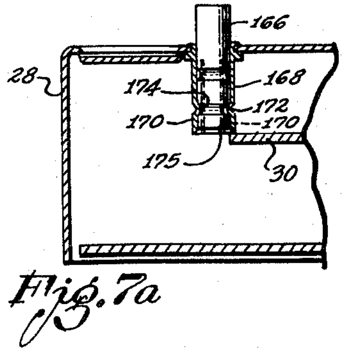
Figures 8, 9, 10, 11:
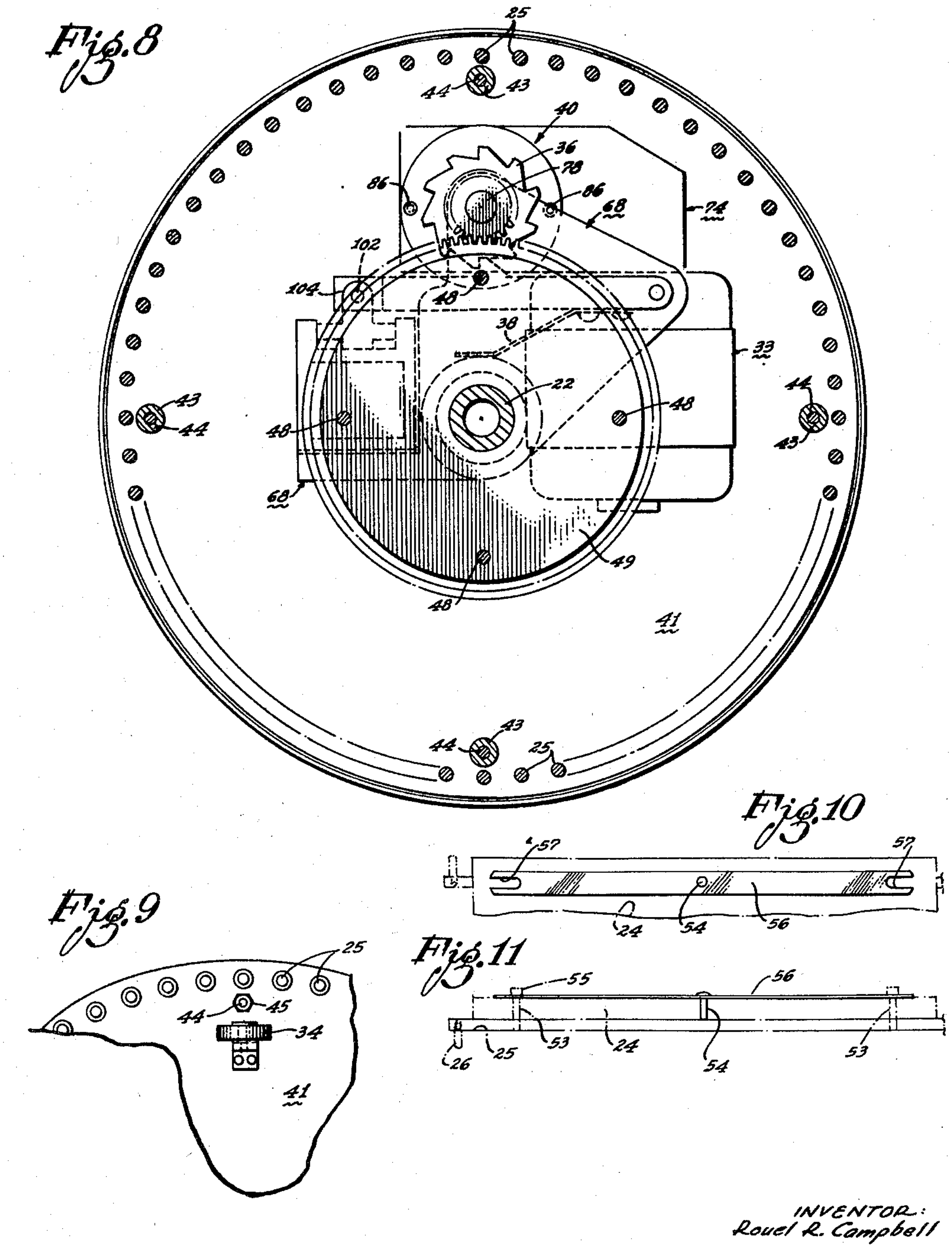

Fig. 7*a* is a similar view of an alternate form of selector member;

Fig. 8 is a transverse section taken as indicated by the angular line 8—8 of Fig. 3;

Fig. 9 is a fragmentary elevational view of means carried by the storage wheel structure for unsetting the selector members;

Fig. 10 is a fragmentary plan view of means that may be employed to secure the catalogs on the support members carried by the wheel structure; and Fig. 11 is an elevational view of the structure shown in Fig. 10.

*General arrangement*

Figure 4:
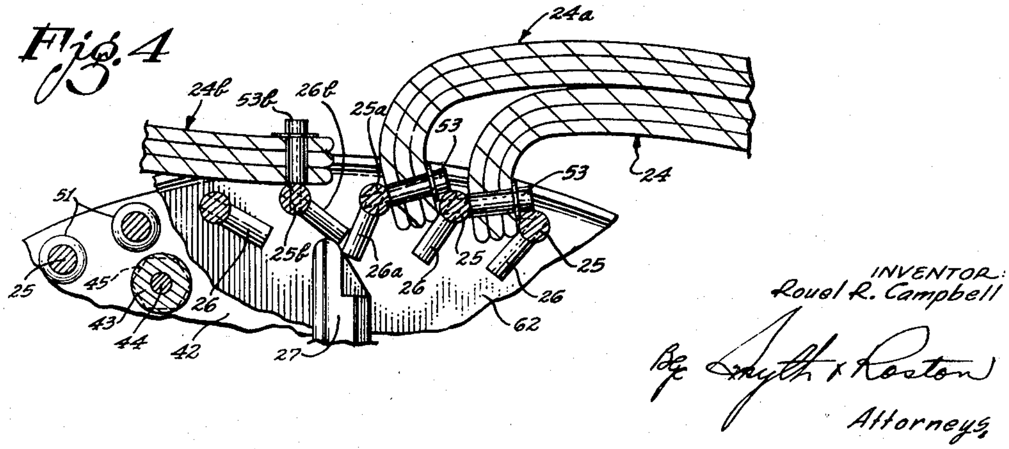
Fig. 4 is a greatly enlarged fragmentary sectional view taken along the line 4—4 of Fig. 3 and showing the manner in which the means for mounting the catalogs on the rotary structure cooperate with a fixed control means to swing the catalogs from one position to another in the region of the inspection station.

In the presently preferred embodiment of the invention shown in the drawings, a rotary storage wheel structure 20 is suitably journaled on a fixed horizontal axle 21, which axle may be supported in any suitable manner. In this instance, the horizontal axle 21 extends laterally from a tubular post 22 that extends upward from a base or foot casting 23. As best shown in Fig. 4, the catalogs or like data units 24 are mounted on the wheel structure 20 by means of a series of circumferentially spaced longitudinal support rods 25. Each support rod 25 has a laterally projecting control portion in the form of a radial pin 26, and all of the radial pins are carried in a circular orbit to move against a fixed control member 27 near the top of the orbit. As each catalog 24 reaches an inspection station at the top of the wheel structure 20, the corresponding radial pin 26 encounters the fixed control member 27 and passes over the control member with a wiping action that causes the catalog to be flipped over.

What may be termed the front end of the wheel structure 20 is enclosed by a fixed flanged guard 28 in which is mounted a circumferential series of selector members in the form of plungers 29. Each selector plunger 29 is movable inward by finger pressure from a normal position shown in Figs. 3 and 7 to an inner effective position where the plunger is releasably engaged by suitable detent means.

The manually inward shift of a selector plunger 29 tilts a floatingly mounted control disk 30 (Fig. 3) which causes an operating plunger 31 to close a normally open switch 32. The switch 32 energizes a motor 33 to cause the wheel structure 20 to rotate counterclockwise as viewed in Fig. 4. When the particular catalog 24 that is represented by the shifted selector plunger 29 reaches the inspection station, a roller 34 (Fig. 3) carried by the wheel structure moves against the shifted selector plunger and forces the selector plunger back to its normal retracted position. The restoration of the control plunger to its retracted position permits the control disk 30 to be restored to its normal position by a spring 35 with consequent de-energization of the motor 33.

In the preferred practice of the invention a stop mechanism comprising a toothed wheel 36, and a pawl member 37 is provided to stop the storage wheel structure 20 precisely at the inspection station whenever an operating cycle is initiated by manipulation of a selector plunger 29. The pawl member 37 is normally held in engagement with the toothed wheel 36 by means of a leaf spring 38, and a suitable solenoid 39 wired in parallel with the motor 33 retracts the pawl member to release the wheel structure for rotation whenever the switch 32 is closed. To permit the motor 33 and the associated gearing to coast when the wheel structure 20 is abruptly stopped in this manner, a friction clutch 40 is used between the motor and the toothed wheel 36.

*The wheel structure*

As best shown in Fig. 3, the wheel structure 20 may comprise two end disks 41 and 42 that are interconnected by four longitudinal members 43 to form a rigid frame structure. Each of the longitudinal frame members 43 may be in the form of a tube abutting the two end disks with a tension rod 44 extending through the tube and carrying nuts 45 on its opposite ends to clamp the two disks against the tube ends. The forward end disk 41 is journaled on the horizontal axle 21 by a bearing ring 46 to which the disk is attached by suitable rivets 47. The rear end disk 42 is attached by rivets 48 to a gear 49 that is suitably journaled on the axle 21.

As heretofore stated, the catalogs 24 are individually mounted on corresponding longitudinal support rods 25. Each of the support rods 25 is suitably journaled in the two end disks 41 and 42 of the wheel structure and for this purpose may be mounted at its opposite ends in nylon bearing sleeves 51. As indicated at the lower right portion of Fig. 3, each of the nylon bearing sleeves 51 extends through a corresponding aperture in an end disk and is formed with a circumferential groove 52 for engagement with the end disk.

Figs. 4, 10 and 11 show how the catalogs 24 are mounted on the rods 25. Each of the catalogs 24 is punched with three holes in a well-known manner to receive two end pins 53 and an intermediate pin 54. Each of the end pins 53 is mounted on the rod 25 in a position extending radially therefrom and each of the end pins is further formed with a head 55 for engagement with suitable means to secure the catalog. In this instance, the securing means comprises a leaf spring 56 shown in Figs. 10 and 11, which leaf spring has slots 57 at its opposite ends for engagement with the headed pins 53. Once a catalog or set of catalogs is mounted on the two headed pins 53 of a rod 25, the leaf spring 56 may be bowed for engagement with the two headed pins and then may be released to take a flat position against the outer surface of the catalog. The intermediate pin 54 is carried by the leaf spring 56 but may be omitted if desired. In addition, each support rod 25 has a previously mentioned radial pin 26 for cooperation with the fixed control member 27.

The wheel structure 20 is driven counterclockwise as viewed in Fig. 4. Each of the catalogs 24 at the bottom of its orbit hangs vertically downward and as the catalog is carried upward in the counterclockwise direction the catalog takes a position extending in the circumferential direction that is opposite to the direction of rotation. Thus, the catalog **24*a* in Fig. 4 lies in a clockwise extending position as it approaches the top of its orbit. It will be noted that the longitudinal support rod 25*a* on which the catalog 24*a* is mounted is held at a limit position because the two headed pins 53 thereon rest against a stop means which in this instance is the next adjacent longitudinal support rod 25. At this limit position the longitudinal support rod 25*a* holds the base portion of the catalog 24*a* slightly inclined in the direction of rotation so that only a slight counterclockwise turn of the support rod 25*a* is required to flip the catalog 24*a* to the oppositely extending flat position of a catalog 24*b*. The required slight rotation of the support rod 25*a* is accomplished by impingement of its radial pin 26 against the fixed control member 27 as the support rod 25*a* moves in its orbit to the position of the support rod 25*b***.

If a person stands at the near or front end of the wheel structure 20 as viewed in Fig. 4, the catalog **24*a* is in the most convenient position for the operator to leaf through its pages, especially because the base portion of the catalog is inclined in the direction in which the pages are to be turned to reach a desired page. Therefore, the position of the catalog 24*a* is the preferred position of the catalog at the inspection station, the catalog being oriented on the support rod 25*a*** to be read by an operator standing at the near end of the wheel structure.

It is to be noted, however, that the catalogs may be oriented on the support rods in the opposite manner to be read from the opposite end of the rotary wheel, in which event the catalog **24*b* would represent the inspection station. If the wheel structure is to be used in this opposite manner, the support post 22** will, of course, be also reversed to the opposite end of the wheel structure.

From the foregoing discussion it is apparent that in the preferred practice of the invention the radial pin 26 of a support rod 25 on which a catalog 24 is mounted does not make operating contact with the fixed control member 27 until the catalog moves past the fixed control member. If the reverse arrangement is employed, however, the radial pin 26 of the support rod 25 makes operative contact with the fixed control member 27 before the catalog reaches the inspection station.

In the construction shown, the fixed control member 27 is a metal rod of hexagonal cross-sectional configuration that is threaded onto one end of a dimetrical pin 60 in the axle 22. In this position the fixed control member 27 serves as a support for the flanged guard disk 62 that encloses the rear end of the wheel structure 20. For further support of the flanged guard disk 62, a second member 64 of hexagonal cross-sectional configuration is mounted in the same radial manner on the opposite end of the diametrical pin 60. The forward flanged guard disk 28 enclosing the front end of the wheel structure 20 is mounted by screws 66 on the tubular end of the axle 21 as shown in Fig. 3.

*Means to actuate and stop the storage wheel*

Fixedly embracing the horizontal axle 21 inside the wheel structure 20 is a bracket 68 having a pair of spaced wings 70. The motor 33 is mounted on the bracket 68 and actuates gearing in a gear case 74 that is united with the motor housing. A drive shaft 75 actuated by the gearing is connected by the previously mentioned friction clutch 40 with a second shaft 78 that is journaled in the two bracket wings 70. The shaft 78 carries a pinion 80 in mesh with the previously mentioned gear 49. Thus, the motor 33 is operatively connected to the wheel structure through reduction gearing to rotate the wheel structure at a desirable rate. For example, a wheel structure twelve inches in diameter may be rotated at 6 to 10 r.p.m.

In the construction shown, the friction clutch 40 comprises a drive disk 82 carried by the drive shaft 75 and a driven disk 84 carried by the second shaft 78, the driven disk being smaller in diameter than the drive disk. Cooperating with a drive disk 82 is a friction ring 85 in pressure contact with the opposite face of the driven disk 84. The friction ring 85 is supported by pins 86 attached thereto that extend through corresponding apertures in the drive disk 82. Suitable coil springs 88 are mounted on the pins 86 in compression between the drive disk 82 and washers 90 backed up by nuts 92 on the pins. Thus, the coil springs 88 cause the driven disk 84 to be clamped under pressure of a desirable degree between the drive disk 82 and the friction ring 85.

Any suitable provision may be made to stop rotation of the wheel structure 20 promptly when the motor 33 is de-energized. Instead of employing a brake for this purpose, I prefer to employ the previously mentioned positive stop mechanism that includes the toothed wheel 36. This toothed wheel is mounted on the shaft 78 between the two bracket wings 70.

Figure 6:
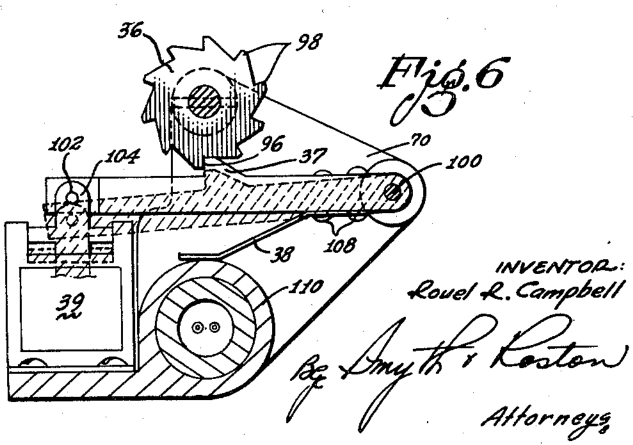
Fig. 6 is a sectional view taken as indicated by the line 6—6 of Fig. 3 showing the construction of an electrically controlled stop mechanism that is employed in the preferred practice of the invention.

As best shown in Fig. 6, the toothed wheel 36 is of the general character of a ratchet wheel for cooperation with the pawl member 37, the pawl member having a stop shoulder 96 to cooperate with the teeth 98 of the wheel. One end of the pawl member 37 is mounted on a pivot pin 100 that is carried by the two bracket wings 70 and the other end of the pawl member is pivotally connected by a pin 102 to the armature 104 of the solenoid 39. Normally, the pawl member 37 is in its upper position with the stop shoulder 96 in the path of a tooth 98. The pawl member is yieldingly held in this position by the previously mentioned leaf spring 38 that is attached thereto by suitable rivets 108 in a position to press downward against a tubular portion 110 of the bracket 68.

When the motor 33 is energized to rotate the wheel structure 20, the solenoid 39 is also energized to retract the pawl member 37 out of engagement with the toothed wheel 36. When the motor is de-energized to stop rotation of the wheel structure 20, the consequent simultaneous de-energization of the solenoid 39 results in upward spring-actuated movement of the pawl member 37 into engagement with the toothed wheel 36 to stop the wheel structure 20 in a positive manner. The friction clutch 40 permits the motor 33 with the gearing in the gear case 74 to coast to a stop. In this instance, there are sixty rods 25 on the wheel structure 20 to support sixty catalogs 24 so that the catalogs are 6 degrees apart and each tooth 98 of the stop wheel 36 represents 6 degrees of rotation of the wheel structure 20.

*The automatic selection control*

Figures 5, 7:
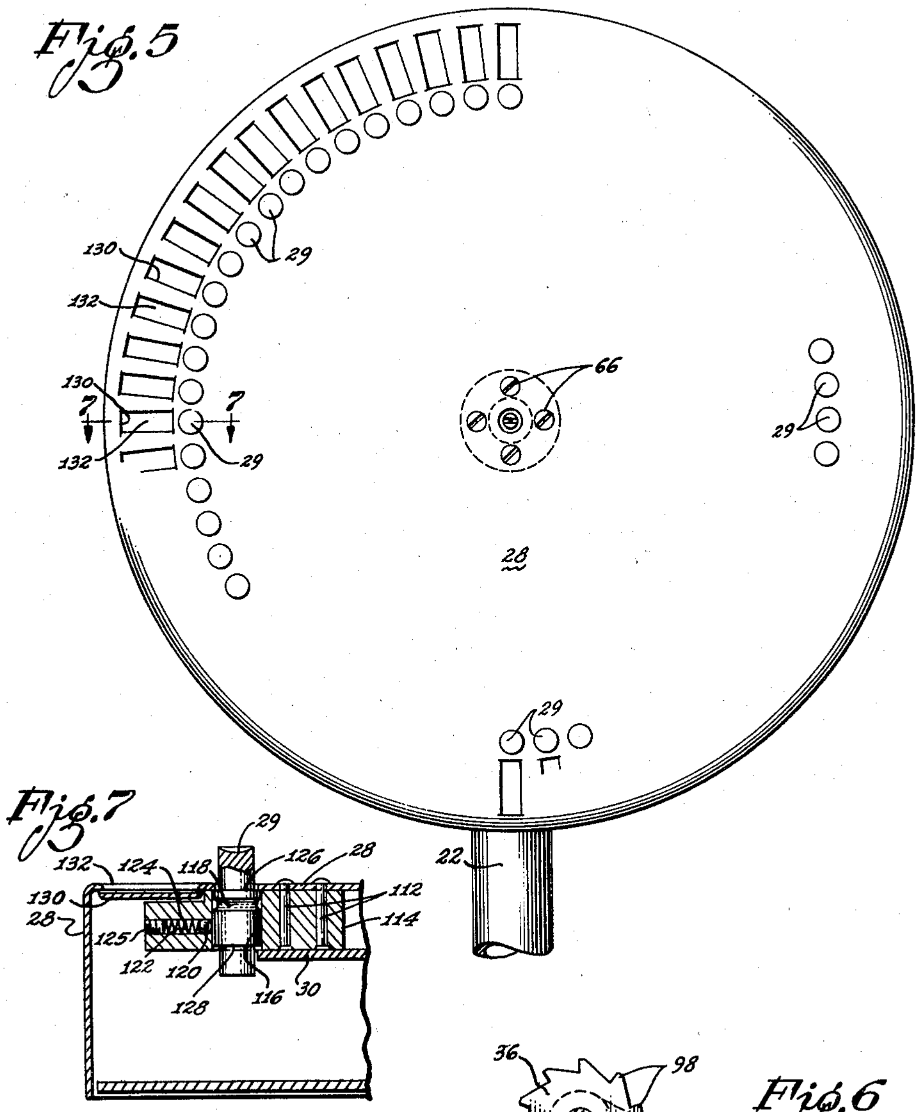
Fig. 5 is an elevational view showing the series of selector members employed for automatic selection control, each selector member being identified by suitable indicia.
Fig. 7 is an enlarged fragmentary section taken as indicated by the line 7—7 of Fig. 5 and showing the construction of one form of the selector member.

Mounted on the inner face of the forward flanged guard disk 28 by means of rivets 112 is a thick metal ring 114 to serve as means for mounting the previously mentioned circumferential series of selector members or plungers 29 and also to serve as abutment means for the control disk 30. Each of the selector plungers is slidingly mounted in a bore 116 that extends through the flanged guard disk 28 and the underlying metal ring 114. As best shown in Fig. 7, each of the selector plungers 29 may be formed with a circumferential groove 118 for engagement by a corresponding detent ball 120. Each detent ball 120 is mounted in a radial bore 122 in the metal ring 114, a suitable coil spring 124 being retained in the bore by a screw plug 125 to press the detent ball inward against the selector plunger. Each selector plunger 29 is formed with an outwardly facing circumferential shoulder 126 to abut the inner face of the flanged guard disk 28 to limit the outward movement of the plunger.

Fig. 7 shows a selector plunger 29 at its normal retracted position with its shoulder 126 against the flanged guard disk 28. It is apparent that the slector plunger 29 may be pushed inward by finger pressure to its extended or effective position at which the circumferential groove 118 is releasably engaged by the detent ball 120. Immediately adjacent each of the selector plungers 29 in a position extending radially outward therefrom is an associated depression 130 in the flanged guard disk 28 to receive a suitable label 132 carrying indicia to identify the catalog that corresponds to the selector plunger.

The previously mentioned control disk 30 abuts in a floating manner against the metal ring 114. The circular series of selector plungers 29 extend beyond the peripheral edge of the control disk 30 to confine the control disk and each of the selector plungers is formed with an inwardly facing circumferential shoulder 128 for engagement with the control disk.

The control disk 30 is centrally apertured to clear the axle 21 and abuts a ring assembly, generally disgnated 138, that floatingly surrounds the axle 21. The ring assembly 138 comprises a pair of rings 140 and 142 and an intermediate diametrical bar 144 attached thereto, which bar is mounted in a pair of radial slots 145 in the tubular end of the axle 21. The previously mentioned coil spring 35 inside the tubular axle continuously presses the ring assembly 138 against the control disk 30.

For operatively conecting the control disk 30 with the switch 32, the switch is provided with an operating arm 148 that extends into a diametrical bore 150 in the axle 21 and the previously mentioned operating plunger 31 is slidingly mounted in an adjacent axial bore 154 to move against the operating arm. The plunger has a stem 155 that is threaded into the diametrical bar 144 in an adjustable manner, the stem being locked at an adjusted position by means of a lock nut 156.

Figures 1, 2:
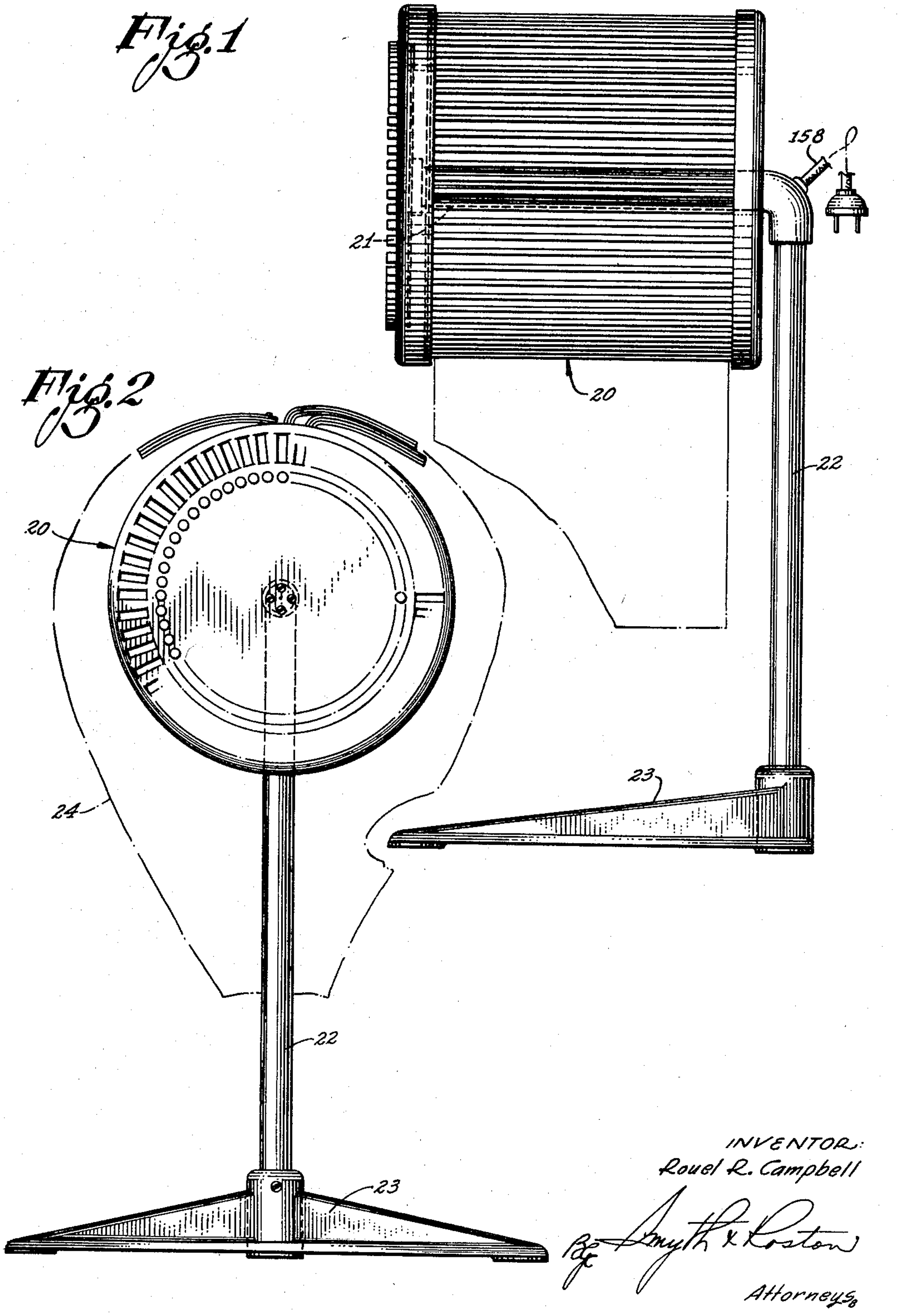
Fig. 1 is a side elevation of a selected embodiment of the invention for filing catalogs.
Fig. 2 is an end view of the same embodiment of the invention.

As shown in Fig. 1, the tubular post 22 may be equipped with a two-wire electric cable 158 by means of which the motor 33 may be plugged into a power circuit. As shown diagrammatically in Fig. 3, one wire 160 from the cable 158 is connected to one terminal of the motor 33 and the other wire 162 from the cable is connected to one side of the switch 32. The wire 160 is also connected by a wire 164 with one side of the solenoid 39, and the second side of the solenoid is connected by a wire 165 to the second side of the switch 32. Thus, the solenoid 39 and the motor 33 are wired in parallel to be simultaneously energized and de-energized by operation of the switch 32.

From the foregoing description it is apparent that with the parts in their normal positions shown in Figs. 3, 6 and 7, the operator makes available any of the desired catalogs 24 by referring to the index labels 132 and by depressing whatever selector plunger 29 corresponds to the desired catalog. The depressed selector plunger 29 is held in its effective position by the spring-pressed detent ball 120, and thus yieldingly holds the control disk 30 tilted out of its normal vertical position against the resistance of the spring 35. The tilting of the control disk 30 pushes the operating plunger 31 against the operating arm 148 of the switch 32 to close the switch.

The closing of the switch 32 completes the circuit for energizing the motor 33 and the solenoid 39. The solenoid 39 retracts the pawl 37 from the stop wheel 36 to permit the storage wheel 20 to be rotated, and the motor drives the storage wheel counterclockwise, as viewed in Fig. 4, until the roller 34 carried by the storage wheel reaches the extended selector plunger 29 to push the selector plunger back to its normal retracted position. The retraction of the selector plunger 29 permits the spring 35 to restore the control disk 30 to its normal position with consequent opening of the switch 32. Opening of the switch 32 de-energizes both the motor 33 and the solenoid 39. The leaf spring 38 returns the pawl member 37 to its effective position for cooperation with the toothed wheel 36 to stop the storage wheel accurately at the desired position, and the friction clutch 40 permits the motor and its associated gearing to coast to a stop after the storage wheel is stopped.

As each catalog 24 is carried upward on its orbit, it takes the backwardly curved position shown at the right in Fig. 4, but at the top of the orbit the radial pin 26 corresponding to the catalog reaches the stationary control member 27 and is actuated thereby to flip the catalog leftward to the position of the catalog designated **24*b*. The inspection station, however, is by preference the station represented by catalog 24*a* in Fig. 4, and whatever catalog corresponds to the depressed selector plunger 29** is brought to this station when the wheel stops. As heretofore stated, the selected catalog is then in a position that is highly convenient for the user since the catalog is bent in the direction from which the leaves must be turned by the user to find a particular item on a particular page.

Fig. 7*a* shows an alternate construction for a selector plunger. The selector plunger 166 in Fig. 7*a* is slidingly mounted in a sleeve 168 that is longitudinally split to form a series of longitudinal spring fingers 170. Each spring finger 170 is offset inwardly to form a detent portion 172 for releasable engagement with a circumferential detent groove 174 in the selector plunger 166. Each selector plunger 166 has the usual inwardly presented circumferential shoulder 175 for operating abutment against the control disk 30 in the previously described manner.

My description in specific detail of the preferred practice of the invention will suggest various changes, substitutions and other departures from my disclosure within the spirit and scope of the appended claims.

I claim:

1. In a storage file for data units in the form of cards, catalogs or the like, wherein the data units are mounted on a rotary carrier driven by a motor for movement with the rotary carrier to an inspection station selectively, an automatic indexing control comprising: a series of selector members corresponding to said data members, respectively, each of said selector members being movable manually from a normal retracted position to an effective extended position; means movable with said rotary carrier to traverse said series of selector members along a path to force the extended selector members back to their normal retracted position; and means responsive to extension of any one of said selector members to energize said motor as long as the selector member is extended, whereby manual extension of the selector member causes the motor to rotate the carrier for retraction of the selector member with consequent deenergization of the motor when the corresponding data unit reaches said inspection station.

2. A combination as set forth in claim 1 in which said carrier is rotatably mounted on a fixed horizontal support extending along the axis of the carrier; and in which said motor is mounted on said support inside the carrier.

3. A combination as set forth in claim 1 which further includes: a rotary set of stop teeth operatively connected with said carrier; stop means normally engaging said set of stop teeth to immobilize the carrier; and electrical means electrically interlocked with said motor to retract said stop means relative to said set of stop teeth when the motor is energized.

4. A combination as set forth in claim 3 in which said motor, set of stop teeth, stop means and electrical means are all mounted inside said carrier.

5. In a storage file for multiple-sheet data units, wherein the data units are mounted on the periphery of a rotary storage wheel to be positioned thereby selectively at an inspection station at the top side of the wheel, means to mount the data units on the wheel and to expose the data units at the inspection station, said mounting and exposing means comprising: a series of support members for engaging said data units adjacent the edges of the data units, said support members being circumferentially spaced apart on said wheel and extending longitudinally thereof, each of said support members being journaled on the storage wheel to permit the data member thereon to swing from a position extending in one circumferential direction to a position extending in the opposite circumferential direction whereby each data unit takes a pendant position at the bottom side of the wheel and then takes a position extending counter to the direction of rotation of the wheel as the data member approaches said inspection station, each of said support members having a control portion spaced from its axis of rotation; and stationary means in the orbit of said control portions in the upper region of the orbit for impingement by said control portions to turn the data units to positions extending in the direction of rotation of the wheel, whereby the data units are exposed for access at said inspection table in sequence when said wheel is rotated.

6. A combination as set forth in claim 5 in which said stationary means is positioned to turn the data units after the data units reach the inspection station.

7. A combination as set forth in claim 5 in which said stationary means is positioned to turn the data units before the data units reach the inspection station.

8. A combination as set forth in claim 5 in which each of said support members is positioned and dimensioned to rest against an adjacent support member thereby to be held at a limit rotary position as the support member approaches said stationary means.

9. A combination as set forth in claim 5 in which each of said support members comprises: a longitudinal member journaled at its opposite ends on said storage wheel; a plurality of fastening elements united therewith and extending laterally therefrom between the journaled ends thereof for attachment of a multiple-sheet data unit thereto; and means extending laterally from said longitudinal member beyond one of its journaled ends for cooperation with said stationary means.

10. In a storage file for data units in the form of cards, catalogs or the like, wherein the data units are mounted on a rotary carrier driven by a motor for movement with the rotary carrier to an inspection station selectively, an automatic indexing control comprising: a control member extending along a series of selector stations corresponding to said data members; means yieldingly maintaining said control member in a normal position; a series of selector members at said selector stations, respectively, each movable from a normal retracted position to an extended position to force said control member out of its normal position; detent means for each of said selector members to yieldingly maintain the selector member at its extended position in opposition to said yielding mean; means to energize said motor in response to movement of said control member out of its normal position; and means operatively connected with said rotary carrier to traverse said series of selector stations in synchronism with rotation of the carrier to return the extended selectors to their normal retracted positions thereby to de-energize the motor to position at said inspection station data units corresponding to the extended selector members.

11. A combination as set forth in claim 10 which includes means to stop said carrier, comprising: a toothed wheel operatively connected with the carrier, a retractable stop member normally engaging said toothed wheel to immobilize the carrier; and solenoid means electrically interlocked with said motor to retract said stop member when the motor is energized.

12. In a storage file for data units in the form of cards, catalogs or the like, wherein the data units are mounted on a rotary carrier driven by a motor for movement with the rotary carrier to an inspection station selectively, an automatic indexing control comprising: a control member concentric to a circular series of selector stations; abutment means on one side of said control member conforming to a plane passing through said series of stations; means maintaining said control member substantially concentric to said series of stations and yieldingly holding the control member in a normal position against said abutment means; a series of selector members at said selector stations, respectively, corresponding to said data units, each of said selector members being movable from a normal retracted position to an advanced position to tilt said control member away from said abutment means; detent means for each of said selector members to yieldingly maintain the selector member at its extended poistion in opposition to said yielding means; means to energize said motor in response to movement of said control member out of its normal position; and means operatively connected with said carrier for movement synchronously therewith to traverse said series of selector stations to return the extended selector members to their normal retracted positions thereby to de-energize said motor to position at said inspection station data units corresponding to the extended selector member.

13. A combination as set forth in claim 12 in which said control means is a disk; and in which said energizing means is a switch operatively connected to said disk in the axial region thereof to be operated by tilt of the disk.

14. A combination as set forth in claim 13 in which said rotary carrier is journaled on a horizontal support extending axially through the carrier; in which said disk is adjacent one end of the carrier concentrically thereof; and in which said switch is mounted on said axial support inside the carrier.

15. A combination as set forth in claim 13 in which said disk is adjacent one end of the carrier concentrically thereof; and in which said traversing means is mounted on said one end of the carrier.

References Cited in the file of this patent

UNITED STATES PATENTS

| | | |
|---|---|---|
| 585,566 | Gilman | June 29, 1897 |
| 1,004,784 | Hayes et al. | Oct. 3, 1911 |
| 2,168,323 | Bruen | Aug. 8, 1939 |
| 2,343,280 | Cory | Mar. 7, 1944 |
| 2,477,786 | Bruen | Aug. 2, 1949 |
| 2,517,678 | Knittel | Aug. 8, 1950 |
| 2,525,165 | Bossetta | Oct. 10, 1950 |
| 2,698,212 | Sevebeck | Dec. 28, 1954 |
| 2,762,159 | Dear | Sept. 11, 1956 |
| 2,796,308 | Knittel | June 18, 1957 |